Aug. 13, 1940.  C. H. WHITE  2,210,994
TRACTOR MOUNTED IMPLEMENT
Filed Oct. 23, 1936  2 Sheets-Sheet 1

INVENTOR
Charles H. White.
BY
ATTORNEYS

Aug. 13, 1940.     C. H. WHITE     2,210,994
TRACTOR MOUNTED IMPLEMENT
Filed Oct. 23, 1936     2 Sheets-Sheet 2
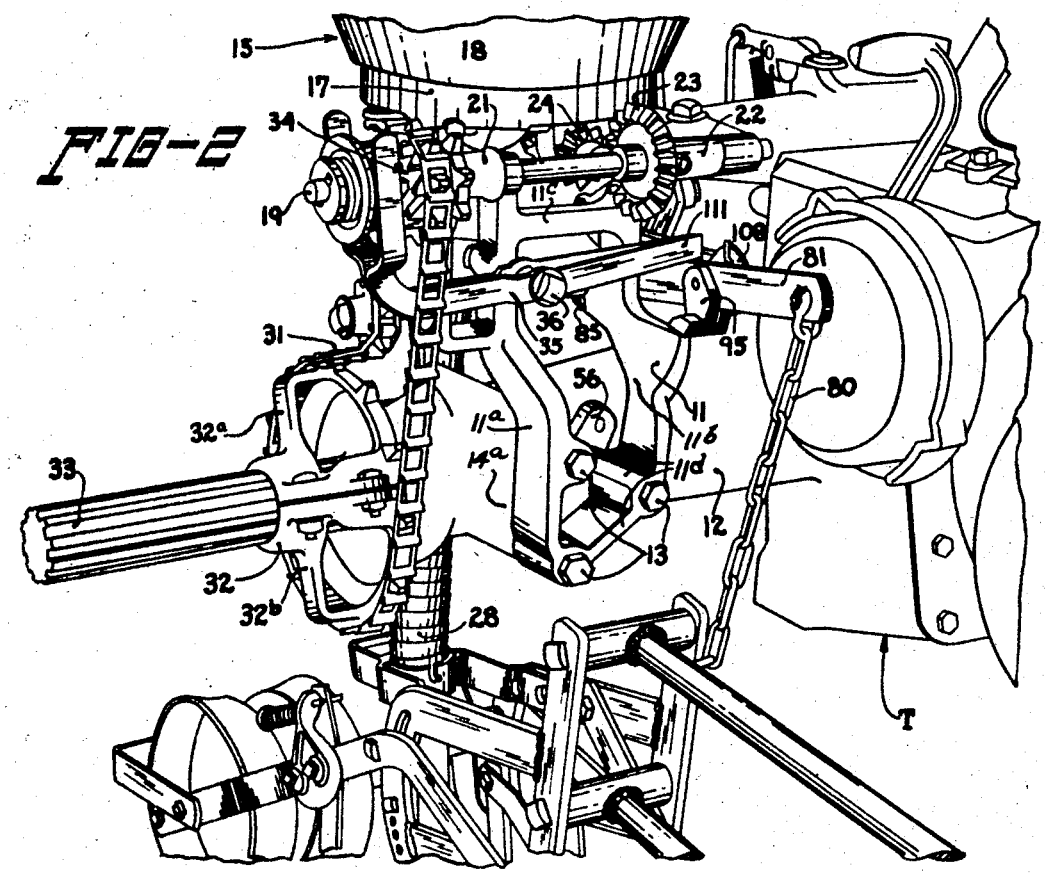
FIG-2
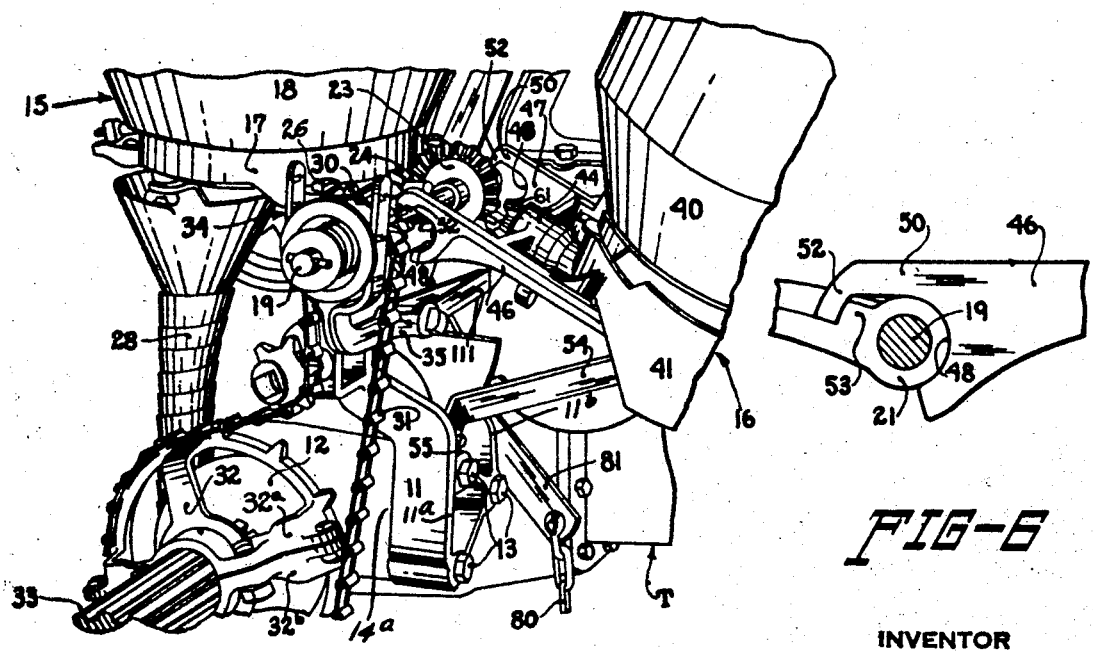
FIG-3
FIG-6
INVENTOR
*Charles H. White.*
BY
ATTORNEYS Patented Aug. 13, 1940

2,210,994

UNITED STATES PATENT OFFICE 2,210,994

TRACTOR MOUNTED IMPLEMENT

Charles H. White, Moline, Ill., assignor to Deere & Company, Moline, Ill., a corporation of Illinois Application October 23, 1936, Serial No. 107,158

48 Claims. (Cl. 111—67)

The present invention relates generally to tractor mounted implements, and more particularly has to do with certain improvements in what are commonly termed tractor mounted two-row planters in which the two planting units are disposed at opposite sides of the tractor.

The present invention has for its principal object to provide improved lifting connections for raising and lowering the planting units of the implement whereby either planting unit may be locked in raised inoperative position independently of the power lift means on the tractor by which such units are moved to operative and inoperative positions.

Another object of the invention is to provide in association with such locking mechanism, means for lifting the planting units into raised position independently of the power lift mechanism, thus adapting the planter for use with tractors that are not provided with power lift mechanism, thereby avoiding the necessity of providing a separate hand lifting mechanism.

A further object of the invention is the provision of novel means whereby the fertilizer attachment unit may readily be attached to or detached from the planting unit.

Other objects and advantageous features will be apparent from the following description of the preferred embodiment of the invention taken in connection with the accompanying drawings, in which—

Figure 2 is a fragmentary perspective view, on an enlarged scale, illustrating the means for supporting the planting unit on the rear axle housing of the tractor and the means for driving the seed selecting mechanism, the fertilizer attachment unit being omitted;

Figure 3 is a fragmentary perspective view, on an enlarged scale, showing the seed selecting unit in position and the supporting means for the fertilizer attachment in position to be connected to the seed selecting unit;

Figure 4 is a fragmentary perspective view, on an enlarged scale, of the lifting connections and the means for supporting the same on the tractor, the lifting connections being shown in their raised and locked position;

Figure 5 is a side elevational view of the lifting connections illustrated in Figure 4, indicating in dotted lines their lowered position and in full lines their raised position; and Figure 6 is a fragmentary side elevational view, on an enlarged scale, of one of the supporting arms of the fertilizer unit in attached position on the planting unit.

Figure 1:
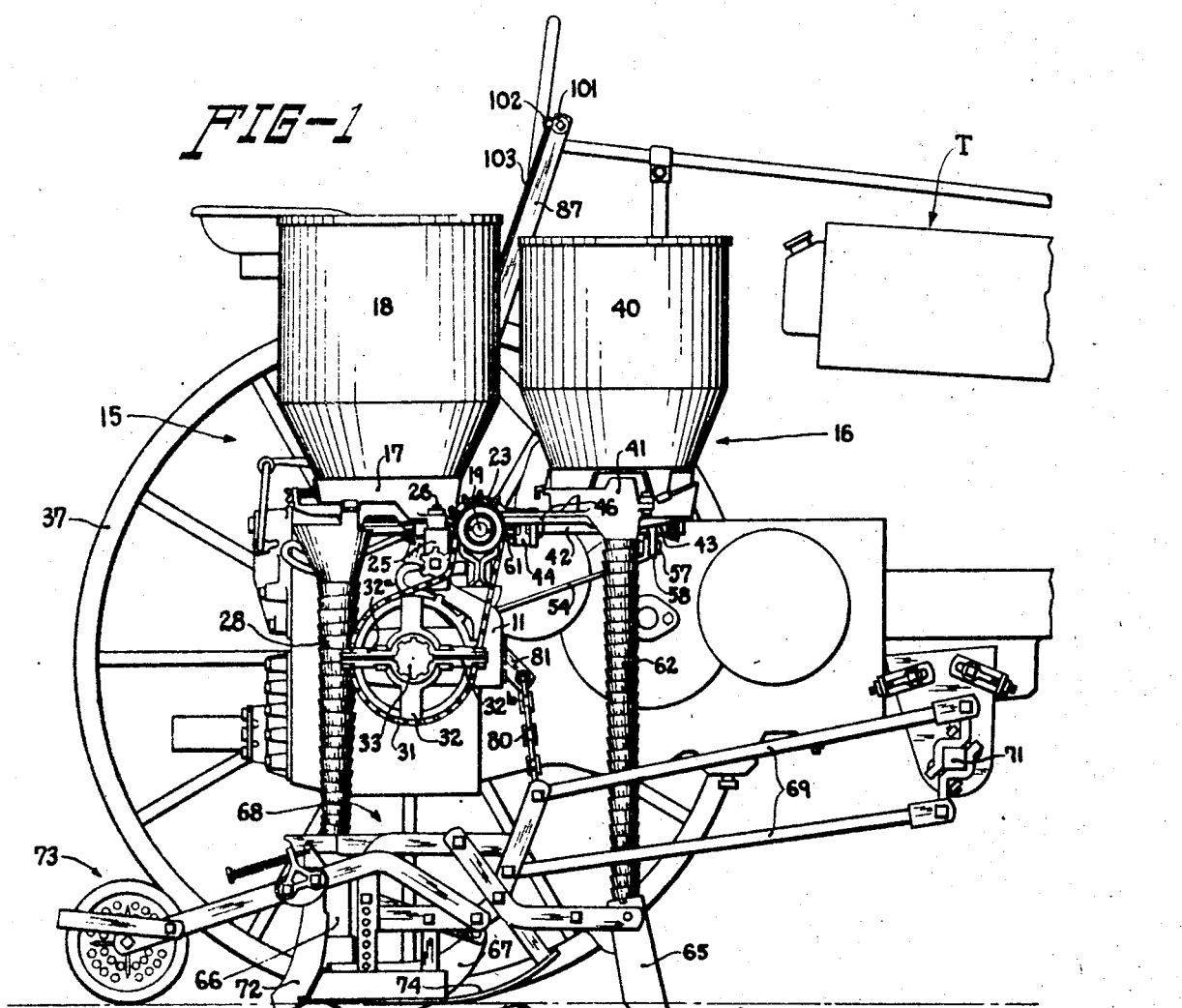
Figure 1 is a side elevational view of a complete planting unit supported at one side of a tractor, the lifting connections being illustrated in the positions they assume when the furrow openers of the planting unit are in operating position.

Referring to the drawings, the tractor, which is only fragmentarily illustrated, is indicated as an entirety by the reference letter T. In a two-row tractor planter, such as that with which the present invention is more particularly concerned, the two planting units are separately and independently supported and connected on opposite sides of the tractor, and as such planting units are identical only that disposed on the right hand side of the machine has been illustrated herein.

The planting unit is connected to the tractor by means of a bracket 11 which is in the form of a suitable casting fixed to the front side of the rear axle housing 12, which extends laterally of the tractor and forms a laterally extending part at each side thereof, by means of a plurality of cap screws 13 or in any other suitable manner. The cap screws 13 thread into tapped attaching means spaced apart laterally on the axle housing 12 to receive the laterally inner and outer screws 13, as best shown in Figure 2. Preferably, these attaching means are in the form of lugs or bosses having screw threaded openings to receive the cap screws 13. The forwardly facing lugs can be seen at 14a in Figures 2, 3 and 4, and the rearwardly facing lugs are shown at 14b in Figure 4. The forward attaching lugs 14a are substantially opposite, in a fore and aft direction, the rear lugs 14b (Figure 4). As best shown in Figure 2, each bracket 11 includes laterally spaced sections 11a and 11b adapted to fit against the forward attaching lugs 14a (Figure 4). The planting unit comprises a seed selecting unit and a fertilizer attachment unit which are indicated in their entireties by the reference numerals 15 and 16, respectively.

The seed selecting unit 15 illustrated in the drawings is of more or less conventional design and is mounted on a cast frame member 17. Each unit 15 comprises a hopper 18 which is provided with the usual seed-selecting mechanism (not shown) in the lower portion thereof. The seed selecting mechanism is driven from a drive shaft 19 journaled in spaced bearing sleeves 21 and 22 (Figure 2) formed integral with the supporting frame 17. Fixed on the drive shaft 19 between the bearing sleeves 21 and 22 is a bevel gear 23 which meshes with a bevel pinion 24 constituting a part of the seed selecting mechanism, whereby the seed selecting mechanism is driven from the shaft 19. The supporting frame 17 of the seed selecting unit 15 is supported on the upper ends of arms 25 (Figure 4) which form the upper portion of the bracket 11, the arms 25 being formed integral with and extending upwardly in rearwardly offset relation from the lower part 25a (Figure 4) of the bracket 11. The laterally spaced bracket sections 11a and 11b are connected together by a section 11c (Figure 2) connecting the arms 25. At the lower ends of the bracket portions 11a and 11b, generally transverse sections 11d connect the vertical sections 11a and 11b. The degree of offset of the upper part of the bracket relative to the lower part is sufficient to bring the upper portion or arms 25 substantially directly over the rear axle housing 12, as best shown in Figure 1. The supporting frame 17 is connected to said arms by means of bolts 26 disposed in openings 27 in the arms 25. A delivery tube 28 receives the seed from the unit 15, and as shown in Figures 1 and 2 the bracket 11 and the supporting frame 17 are so shaped and so positioned on the rear axle housing 12 of the tractor as to dispose the seed delivery tube 28 on the rear side thereof.

The drive shaft 19 of the seed selecting mechanism is driven by a sprocket 30 (Figure 3) which is loosely mounted on the shaft on the outer side of the bearing sleeve 21, as shown in Figure 2, and this sprocket in turn is driven by a drive chain 31 trained around said sprocket and around a sprocket 32 fixed on the rear drive axle 33. Power is transmitted from the sprocket 30 to the drive shaft 19 through a jaw clutch 34 which, in the illustrated construction, is of conventional type. The two elements of the jaw clutch 34 are moved into and out of clutching engagement by means of a lever 35 pivotally supported at 36 on the bracket 11 (see Figure 2) and the lever is actuated by the lifting connections as will be described later herein. As shown, the sprocket 32 is made in two sections, 32a and 32b, suitably bolted together, so that it may be placed in position on the driving axle 33 without removing the drive wheel 37 on the end of the axle 33. In the drawings the tractor drive wheel 37 on the right hand side of the tractor has been omitted in order to better illustrate the several parts of the planting unit.

The fertilizer attachment unit 16 of the present invention comprises a fertilizer container or can 40 (Figure 1) provided with the usual fertilizer selecting mechanism in the lower portion thereof. The can 40 is mounted in any suitable manner on a supporting frame 41, and an operating shaft 42 for driving the fertilizer selecting mechanism is journaled in bearings 43 and 44 formed integral with the supporting frame 41. Also formed integral with and extending rearwardly from the supporting frame 41 are two spaced arms 46 and 47 (see Figure 3). As best shown in Figure 6, the rear ends of the arms 46 and 47 are provided with semi-circular recesses 48 and rearward extensions 50 which at their outer ends are provided with downwardly turned lugs or projections 52, and the inner ends of the bearing sleeves 21 and 22 of the seed selecting unit are provided with bosses or projections 53 which are shaped to correspond to the enclosure formed by the recesses 48, rearward extensions 50 and lugs 52. A brace bar 54, having its rear end bolted as shown at 55 in Figure 3 to a lug 56 (Figure 2) formed on the bracket 11, extends upwardly and forwardly therefrom and has its upper end bolted as shown at 57 (Figure 1) to a lug 58 formed integral with and extending downwardly from the supporting frame 41 of the fertilizer attachment unit. Therefore, when the arms 46 and 47 are hooked over the bosses 53 of the bearing sleeves 21 and 22 and the brace 54 bolted in position, the fertilizer attachment unit will be supported in operating position on the tractor T. The rear end of the operating shaft 42 of the fertilizer attachment unit carries a bevel pinion 61 (Figures 1 and 3), which, when the fertilizer attachment is mounted in operating position on the seed selecting unit, meshes with the bevel gear 23 on the drive shaft 19 for the seed selecting unit. It will be seen, therefore, that the bevel gear 23 of the seed selecting unit transmits power to the fertilizer-selecting mechanism as well as to the seed-selecting mechanism.

When it is desired to connect the fertilizer attachment unit to the seed selecting unit, the fertilizer attachment unit is brought into the tilted position shown in Figure 3 and the lugs 52 can then be readily engaged over the projections 53. The fertilizer attachment is then rotated upwardly about the axis of the shaft 19, into its proper operating position with the bevel pinion 61 in mesh with the bevel gear 23, after which the brace 54 is bolted in position to thereby securely fix the fertilizer attachment in place. It is understood, of course, that the reverse procedure will be followed when disconnecting the fertilizer attachment unit from the seed selecting unit. It will be noted from Figure 1 that as the fertilizer attachment unit is disposed forwardly on the supporting bracket 11 of the planting unit, the delivery tube 62 which receives the fertilizer from the fertilizer selecting mechanism is disposed on the forward side of the rear axle housing 12.

As shown in Figure 1, the fertilizer is fed through a furrow opener 65 and the seed passes from the tube 28 into a pipe or short tube 66 fixedly mounted at the rear end of a furrow opener 67. The furrow openers 65 and 67 and the tube 66 are supported in any suitable manner from a framework 68 connected by means of a pair of draft links 69 with a draft bar 71 suitably fixed to and extending outwardly from the side of the tractor. The usual covering shovels 72, press wheel 73 and depth limiting shoes 74 are also supported on and connected to the framework 68 in any suitable manner. As the particular details of the means for supporting these several parts from the framework 68 and the specific construction of said framework have nothing to do with the present invention and are disclosed and claimed in my copending application, Serial No. 162,256, filed September 3, 1937, it is not deemed necessary to illustrate and describe the same in detail herein.

The furrow openers 65 and 67 and the several other parts above described that are connected therewith by the framework 68 are raised to an inoperative position by lifting mechanism which will now be described. This mechanism comprises a chain 80 which is connected between the framework 68 and the forward end of a lever arm 81 fixed at its rear end on a pin or shaft 82 (Figure 4) journaled in a bearing opening in a lug 83 and in a socket in a lug 84, said lugs being formed integral with the bracket 11. The shaft 82 is held in position by means of a cotter pin 85 inserted through an opening provided therefor in the pin on the outer side of the lug 83. Fixed to the inner end of the pin 82 on the inner side of the lug 83 is the lower end of a hand lever 87 which extends upwardly to a point adjacent the operator's position on the tractor, as shown in Figure 1. Pivotally connected to the hand lever 87 by a pivot bolt 88 is the forward end of a link 89, said link at its rear end being provided with an inwardly bent projection which extends into an arcuate slot 91 in an arm 92 fixed on the power lift rock shaft 93 of the tractor.

In Figure 5 the several parts of the lifting mechanism are shown by dotted lines in the positions they assume when the furrow openers are in lowered or working position, and upon actuation of the power lift to raise the furrow openers to inoperative position the arm 92 is swung in a clockwise direction to move the several parts of the lifting mechanism into the positions shown in full lines. When the power lift is again operated the arm 92 will swing in a counterclockwise direction whereby the furrow openers will descend of their own weight to a working position.

As it is sometimes desirable in the use of two row planters to use only the planting mechanism at one side of the machine and to hold the planting mechanism at the opposite side of the machine in a raised or inoperative position, in the present construction means has been provided for locking either planting unit in a raised position, independent of the power lift, whereby the planting unit in use may be raised and lowered by the power lift at the will of the operator while the other planting unit is maintained in a raised inoperative position. This means includes a weighted dog 95 pivotally mounted on the arm 81, as shown at 96, and this dog is so weighted that it tends to assume the position shown in dotted lines in Figure 5 and in full lines in Figure 4.

As above mentioned, when the implement is raised by the power lift mechanism, the arm 81 moves from its lowered position, shown in dotted lines in Figure 5, to its raised position shown in full lines. As the arm 81 travels from such lowered position to its raised position a projection 97 on the dog 95 slides along an inclined surface 98 of a projection 99 provided on the bracket 11. When the arm 81 reaches its raised position, the dog 95 reaches a point adjacent the upper end of the inclined surface 98, as shown in full lines in Figure 5. Now, if the operator wishes to lock the planting unit so as to hold it in its inoperative or raised position, to which it has been moved by the power lift, he has only to exert a lifting force or rearward pull on the lever 87 sufficiently to raise the furrow openers slightly higher than the position to which they have been raised by the power lift. This will raise the dog 95 above the upper end of the projection 99 and the dog will swing in a clockwise direction under the influence of its own weight over the top edge of the projection 99, whereupon when the operator releases the lifting force applied to the lever 87 the implement will be locked in a raised position by reason of the dog 95 contacting the top edge of the projection 99.

In this connection it will be noted that the provision of the slot 91 in the arm 92 of the power lift will allow the slight rearward pull on the lever 87 that is necessary to permit the locking dog 95 to move into locking position and also that such construction will permit the power lift rock shaft 93 to move in a reverse direction to lower the other planting unit on the opposite side of the tractor, as in such movement of the lever 87 or the lowering of such other unit the inwardly bent projection on the rear end of the link 89 of the lifting mechanism that has been locked in raised position will merely ride in its slot 91 in the arm 92. By this construction, therefore, the planting unit at one side of the tractor may be raised and lowered at the will of the operator while the unit at the opposite side of the tractor is locked in a raised position.

Manually operated means has been provided by which the operator may unlock the furrow openers from a locked raised position so that they will descend to working position, and such means includes a rotatable hand grip 101 pivotally mounted upon the upper end of the operating lever 87 (Figure 1). The hand grip 101 is provided with a rearwardly extending lug 102 to which is connected the upper end of an operating rod 103, the lower end of said rod being connected to a lever 104 (Figure 4) pivotally connected to the lever 87 by any suitable means, such as the pivot bolt 88 before described. A second rod or link 105 is pivotally connected at its rear end to the lever 104 and provided at its forward end with an inwardly and upwardly bent portion 106 which projects into a slot 107 in an arm 108 formed integral with the pivoted locking dog 95. By this construction, when the operator desires to unlock the furrow openers it is only necessary to rotate the hand grip 101 in a clockwise direction to move the operating rod 103 upwardly and simultaneously therewith to pull rearwardly to move the lever 87 to release the weight of the furrow openers off of the locking dog 95. As the rod 103 moves upwardly it pulls the rod 105 rearwardly which in turn swings the dog 95 in a counterclockwise direction. Thereupon the operator moves the lever in a forward direction and as the furrow openers move downwardly under their own weight the lug 97 on the dog 95 passes the projection 99, thus permitting the furrow openers to continue their downward movement into working position. By providing the slot 107 in the arm 108 of the locking dog 95 it can in the locking operation swing under the influence of its own weight from the position shown in full lines in Figure 5 to that shown in Figure 4 without any interference by the link 105, as in such movement of the dog the bent end 106 of the link 105 will slide in such slot.

It will also be apparent from the foregoing description that the hand lever 87 may be used for raising and lowering the furrow openers independently of the power lift, and, therefore, the present construction can be used not only on tractors that are provided with a power lift mechanism but also just as readily on tractors that are not equipped with such lift mechanism, and this is an important advantage of the present construction.

It is of course necessary when the furrow openers are raised to inoperative position that the operation of the seed and fertilizer dispensing mechanisms be automatically stopped concurrently with such raising operation, and the means provided for this purpose will now be described. The lever 35 which controls the operation of the jaw clutch 34 as above described is provided with an arm 111 which extends inwardly from the pivot connection 36 of the lever 35 with the frame and has its outer end overlying the lever arm 81 of the lifting mechanism. As this lever arm 81 is moved upwardly in the raising operation of the furrow openers it will contact the arm 111 and move the same upwardly to thereby rotate the lever 35 on its pivot 36 sufficiently to disengage the jaw clutch 34, which is the position shown in Figure 2. As this clutch 34 controls the operation of both the seed selecting mechanism and the fertilizer selecting mechanism, the operation of such mechanisms will be interrupted whenever the furrow openers are raised to inoperative position.

While I have described, in connection with the accompanying drawings, the specific form in which I prefer to embody my invention, it is to be understood that the invention is not to be limited to the specific means which I have herein shown and described, and that, in fact, widely different means may be employed in the practice of the broader aspects of my invention.

It is also to be understood that while I have illustrated and described my invention in connection with a tractor mounted planter, the invention is also applicable to any other type of tractor mounted implement having units disposed at opposite sides of the tractor and wherein it is desirable that either unit may be locked in raised inoperative position independently of the power lift means on the tractor by which such units are moved to operative and inoperative positions, as will be readily apparent to those skilled in the art, and it will also be apparent that certain features of the present invention are equally applicable to tractors that are not provided with a power lift mechanism.

What I claim is:

1. An agricultural implement comprising the combination of a tractor having a power lift, an implement connected therewith and having operating mechanism mounted in fixed relation on the tractor and parts separate from said operating mechanism and adapted to be lifted into a raised position and lowered into an operating position, mechanism including lost motion connecting said parts with said power lift to be lifted and lowered thereby, manually operated means connected with said mechanism and operative by virtue of said lost motion connecting means for lifting said parts into raised position without moving said power lift, driving connections for said operating mechanism, and means for interrupting said driving connections responsive to movement of a portion of said connecting mechanism between said lost motion means and said parts, whereby movement of the latter into said raised position, regardless of whether the lifting is done manually or by said power lift, interrupts the drive to said operating mechanism.

2. In an agricultural machine comprising a tractor having a power lift and implement means supported on opposite sides of the tractor and each adapted to be moved into either of two positions, the combination of lifting means connecting said power lift with said implement means for moving the latter into one of said positions, means associated with said lifting means for locking each of said implement means in said one position independently of said power lift and for moving each implement means to said one position independently of said power lift, an operating mechanism associated with the implement means on each side of said tractor, a driving connection for each of said mechanisms, and means for disconnecting either of said driving connections responsive to movement of its associated implement means into said one position either by said power lift or independently thereof.

3. In an agricultural machine comprising a tractor having a power lift and planting units supported on opposite sides of the tractor and adapted to be raised to inoperative position, the combination of lifting means connecting said power lift with said planting units for raising said units to inoperative position, means associated with said lifting means for locking each planting unit in inoperative position independently of said power lift, means for raising each unit to inoperative position independently of said power lift, a seed selecting mechanism associated with each of said planting units, a driving connection for each of said mechanisms, and means for disconnecting either of said driving connections responsive to movement of its associated planting unit into raised position either by said power lift or by said independent means.

4. In a two-row tractor planter having a power lift and comprising planting units disposed on opposite sides of the tractor and adapted to be raised and lowered, the combination of lifting means connecting said power lift with said planting units for raising said units, means associated with said lifting means for locking each unit in raised position independently of said power lift and for raising each unit independently of said power lift, lost motion connections between said power lift and said lifting means whereby when one of said planting units is locked in raised position said power lift means is operative to raise and lower the other planting unit, seed selecting mechanisms associated with said planting units, respectively, means for driving each of said mechanisms by power received from the tractor engine, and means responsive to the positions of said units for disconnecting said driving means from their respective seed selecting mechanisms when either of said units is moved to raised position either by said power lift or independently thereof.

5. In a two-row tractor planter having a power lift and comprising planting units disposed on opposite sides of the tractor adapted to be raised and lowered, the combination of a plurality of lifting means connecting said power lift with said planting units for raising said units, a pivoted locking member carried by each of said lifting means, means for normally holding each locking member in unlocked position during actuation of said power lift, and means for causing each locking member to lock the associated planting unit in raised position.

6. In a two-row tractor planter having a power lift and comprising planting units disposed on opposite sides of the tractor adapted to be raised and lowered, the combination of a plurality of lifting means connecting said power lift with said planting units for raising said units, a pivoted locking member carried by each of said lifting means, means for normally holding each locking member in unlocked position during actuation of said power lift, means for causing each locking member to lock the associated planting unit in raised position, and manually operated releasing means for moving said locking member out of locked position.

7. In a two-row tractor planter having a power lift and comprising planting units disposed on opposite sides of the tractor adapted to be raised and lowered, the combination of a plurality of lifting means connecting said power lift with said planting units for raising said units, a pivoted locking member carried by each of said lifting means, means for holding each locking member in unlocked position during actuation of said power lift, and manual means connected with each of said lifting means for raising said lifting means beyond the point to which it is raised by said power lift whereby by operating either of said manual means its associated locking member is moved out of contact with said holding means and swings on its pivot into a position to lock said lifting means in raised position.

8. In a two-row tractor planter having a power lift and comprising planting units disposed on opposite sides of the tractor adapted to be raised and lowered, the combination of a plurality of lifting means connecting said power lift with said planting units for raising said units, a pivoted locking member carried by each of said lifting means, means for holding each locking member in unlocked position during actuation of said power lift, manual means connected with each of said lifting means for raising said lifting means beyond the point to which it is raised by said power lift whereby by operating either of said manual means its associated locking member is moved out of contact with said holding means and swings on its pivot into a position to lock said lifting means in raised position, and a lost motion connection between said lifting means and said power lift to provide for movement of said lifting means independently of said power lift upon actuation of said manual means.

9. In a two-row tractor planter having a power lift and comprising planting units disposed on opposite sides of the tractor and adapted to be raised and lowered, the combination of a plurality of lifting means connecting said power lift with said planting units for raising said units, a weighted locking dog pivotally mounted on each of said lifting means and adapted to normally lie in a locking position, stop means for holding said locking dog in unlocked position during the raising operation of said power lift mechanism, and manual means operable to move said locking dog beyond said stop means whereby said dog will automatically move into a position to lock said lifting means in a raised position.

10. In a two-row tractor planter having a power lift and comprising planting units disposed on opposite sides of the tractor adapted to be raised and lowered, the combination of a plurality of lifting means connecting said power lift with said planting units for raising said units, manual means connected with each of said lifting means for raising said units independently of said power lift, seed selecting mechanisms associated with said planting units, respectively, means for driving each of said mechanisms by power received from the tractor engine, and means responsive to the positions of said units for disconnecting said driving means from their respective seed selecting mechanisms when either of said units is moved to raised position either by said power lift or independently thereof.

11. In a two-row tractor planter having a power lift and comprising planting units disposed on opposite sides of the tractor and adapted to be raised and lowered, of a manually operated lifting means for raising each of said planting units independently of said power lift, and a lost motion connection between said power lift and each of said lifting means whereby said lifting means is adapted to be raised by said manual means beyond the point to which it is raised by said power lift, each of said lifting means including a pivotally connected weighted locking dog adapted to move into a locking position when said planting units have been raised by said lifting means beyond the point to which they are raised by the power lift.

12. In a two-row tractor planter having a power lift and comprising planting units disposed on opposite sides of the tractor and adapted to be raised and lowered, the combination of a plurality of lifting means connecting said power lift with said planting units for raising said units, a weighted locking dog pivotally mounted on each of said lifting means and adapted to normally lie in a locking position, stop means for holding each locking dog in unlocked position during the raising operation of said power lift, manual means operable to move each locking dog beyond said stop means whereby said dog will automatically move into a position to lock said lifting means in a raised position, manually operated releasing means for moving each locking dog out of locked position, and a lost motion connection between each releasing means and its associated locking dog to permit said dog to swing into a locking position.

13. A planter comprising a seed selecting unit having seed selecting mechanism, a driving gear for driving said seed selecting mechanism, a shaft supporting said gear, bearing means on said unit receiving said shaft, a fertilizer attachment unit having fertilizer selecting mechanism, and means detachably connecting said fertilizer attachment unit to the bearing means of said seed selecting unit, said fertilizer attachment unit including a pinion adapted to mesh directly with said driving gear when the fertilizer attachment unit is connected to said seed selecting unit whereby said fertilizer selecting mechanism is driven from said driving gear.

14. A planter including a seed selecting unit, a frame supporting said unit, a pair of bosses formed integral with said frame and extending outwardly therefrom, a driving gear supported on said frame for driving said seed selecting unit, a fertilizer attachment unit including a gear member, means detachably connecting said fertilizer attachment unit to said seed selecting unit comprising a pair of arms, and recesses formed in said bosses to receive said arms and position said fertilizer unit gear member in operative association with said seeding unit driving gear.

15. A planter including a seed selecting unit having a frame, a pair of bosses formed integral with said frame and extending outwardly therefrom, a driving gear supported on said frame for driving said seed selecting unit, lug receiving recesses formed in said bosses, a fertilizer attachment unit including a driving gear member, a pair of arms carried by said fertilizer unit and having recesses formed therein for receiving said bosses, and means on said arms extending outwardly from the recesses therein and provided with downwardly extending lugs adapted to seat in the lug receiving recesses in said bosses so as to hold said fertilizer unit driving gear member in mesh with said feeding unit driving gear to be driven therefrom.

16. A planter comprising in combination a seed selecting unit having seed selecting mechanism, a driving shaft, a driving gear on said driving shaft for driving said seed selecting mechanism, bearing sleeves receiving said driving shaft, bosses formed on said bearing sleeves, a fertilizer attachment unit having fertilizer feeding mechanism, and means detachably connecting said fertilizer attachment unit to said seed selecting unit comprising a pair of arms on the fertilizer attachment and means formed on the outer ends of said arms adapted to fit over said bosses so as to dispose the fertilizer feeding mechanism in a position to be driven from said driving gear.

17. An agricultural implement comprising the combination of a tractor having a rear axle housing, an axle shaft therein, a seed selecting unit, a bracket attached to said axle housing and extending generally vertically therefrom and supporting said unit wholly on and directly over said rear axle housing, said seed selecting unit including a seeding shaft, and means, including a drive chain extending upwardly generally alongside said bracket, for driving said seeding shaft from said axle shaft.

18. An agricultural implement as defined in claim 17, further characterized by said driving means including clutch mechanism, and a transverse part supported adjacent the upper end of said bracket for operating said clutch mechanism.

19. A tractor planter comprising the combination of a tractor having a power lift and a rear axle housing, planting units comprising seed dispensing mechanism supported in fixed position on said axle housing substantially directly above the latter at opposite sides of the tractor and furrow opening parts positioned substantially directly below said axle housing and adapted to be raised and lowered toward and away from said axle housing, a seed tube extending directly downwardly from each of said units and alongside said rear axle housing to the associated furrow opening part, lifting means including a lever pivoted to said axle housing at each side of the tractor and extending forwardly of the axle housing for connecting said power lift with the forward portions of said parts for raising the latter, and means reacting against said axle housing for locking the parts of either unit in raised position independently of said power lift.

20. An agricultural implement as defined in claim 19 in which each planting unit includes a seeding shaft, means rigidly supporting said unit wholly on and substantially directly above said housing, means for driving said seeding shaft from said driving axle, clutch means also supported on said housing for interrupting the driving connection between said driving axle and said seeding shaft, and means movably mounted on said axle housing for operating said clutch means from one of said forwardly extending parts.

21. An agricultural implement comprising the combination of a tractor having a power lift, a driving axle and a housing enclosing the same at each side of the tractor, a planting unit at each side of the tractor, each planting unit including a seeding shaft supported on the associated axle housing and a furrow opener adapted to be raised and lowered, lifting means connecting said power lift with the furrow opener of each unit for raising the furrow openers, a driving connection between each seeding shaft and the driving axle at that side of the tractor, means for interrupting the driving connection for each seeding shaft when said power lift is actuated to raise the furrow opener for the planting unit at that side of the tractor, whereby the raising of either furrow opener automatically throws the associated planting unit out of operation and means for raising either furrow opened independently of the power lift and interrupting the associated driving connection.

22. An agricultural implement comprising the combination of a tractor having a rear axle housing, planting mechanism including seed selecting mechanism supported on said axle housing at one side thereof, fertilizer distributing mechanism supported on said housing at the side opposite the seed selecting mechanism, a horizontally disposed seeding shaft supported on said housing between said fertilizer distributing mechanism and said seed selecting mechanism, means operatively connected with the seeding shaft and extending therefrom in generally opposite directions for driving said mechanisms, and means for driving said seeding shaft.

23. An agricultural implement comprising the combination of a tractor having a laterally extending part, planting mechanism including seed selecting mechanism supported on said part at one side thereof, fertilizer distributing mechanism supported on said part at the side opposite the seed selecting mechanism, a horizontally disposed seeding shaft supported between said fertilizer distributing mechanism and said seed selecting mechanism, means operatively connected with the seeding shaft and extending therefrom in generally opposite directions for driving said mechanisms from said seeding shaft, and means for driving said seeding shaft.

24. An agricultural implement comprising the combination of a tractor having a rear axle housing, planting mechanism including seed selecting mechanism supported on said axle housing at one side thereof, fertilizer distributing mechanism supported on said housing at the side opposite the seed selecting mechanism, a horizontally disposed seeding shaft supported on said housing between said fertilizer distributing mechanism and said seed selecting mechanism, means extending forwardly from the seed selecting mechanism and rearwardly from the fertilizer distributing mechanism for driving said mechanisms from said seeding shaft, and means for driving said seeding shaft.

25. An agricultural implement comprising the combination of a tractor having a rear axle housing, a driving shaft supported in said rear axle housing, a bracket secured to said housing, planting mechanism including seed selecting mechanism supported on said bracket at one side of said axle housing, fertilizer distributing mechanism supported by said bracket on the opposite side of said axle housing to said seed selecting mechanism, a seeding shaft supported on said bracket, means for driving said seed selecting mechanism and said fertilizer distributing mechanism from said seeding shaft, and means for driving said seeding shaft from said driving shaft.

26. An agricultural implement comprising the combination of a tractor having a rear axle housing at each side of the tractor, planting and fertilizer distributing mechanism supported on each axle housing, a separate connection for driving each of said planting and fertilizing distributing mechanisms, a furrow opener associated with each of said planting and fertilizer distributing mechanisms and adapted to be raised and lowered, power-lift mechanism for raising said furrow openers, means mounted on each of said axle housings and operable to interrupt the driving connection for the planting and fertilizer distributing mechanism at that side of the tractor when said power lift is actuated to raise the furrow openers, and a hand lever associated with each of said planting and fertilizer distributing mechanisms for raising the furrow openers associated therewith and operating to interrupt only the driving connection of its associated planting and fertilizer distributing mechanism.

27. A planter comprising a supporting frame, a seed selecting unit, a bracket connecting said seed selecting unit to said frame, a driving gear supported on said bracket for driving said seed selecting unit, a fertilizer attachment unit including a driving gear member, means detachably connecting said fertilizer unit to said supporting bracket comprising an arm member on said fertilizer unit and cooperative means on said bracket to engage said arm member and position said fertilizer unit gear member in operative association with said seed selecting unit driving gear.

28. In combination with a tractor having laterally extending axle housings, a planter including a seed selecting unit, a supporting frame therefor, means for attaching said frame to one of said axle housings to be supported thereby in fixed relation thereto, a driving gear supported on said frame for driving said seed selecting unit, means for driving said gear from power received from the tractor engine, a fertilizer attachment unit including a driving gear member, means detachably connecting said fertilizer unit to said supporting frame comprising a bracket member on said fertilizer unit and cooperative means on said frame to engage said bracket member and position said fertilizer unit gear member in operative association with said seed selecting unit driving gear.

29. In combination with a tractor having laterally extending rear axle housings, a planter including a seed selecting unit, a supporting frame therefor, means for attaching said frame to one of said axle housings to be supported thereby in fixed relation thereto whereby said seed selecting unit is positioned generally on one side of said axle housing, a driving gear supported on said frame for driving said seed selecting unit, means for driving said gear by power received from the tractor engine, a fertilizer attachment unit including a driving gear member, means detachably connecting said fertilizer unit to said supporting frame comprising a bracket member on said fertilizer unit and cooperative means on said frame to engage said bracket member and position said fertilizer unit in fixed position on the other side of said axle housing relative to said seed selecting unit and to maintain said fertilizer unit gear member in operative association with said seed selecting unit driving gear.

30. In combination with a tractor having laterally extending rear axle housings, a planter including a seed selecting unit, a supporting frame therefor, means for attaching said frame to one of said axle housings to be supported above the latter in fixed relation thereto, a seed delivery tube associated with said unit and depending therefrom on one side of said axle housing, a driving gear supported on said frame for driving said seed selecting unit, means for driving said gear by power received from the tractor engine, a fertilizer attachment unit including a driving gear member, means detachably connecting said fertilizer unit to said supporting frame comprising a bracket member on said fertilizer unit and cooperative means on said frame to engage said bracket member and position said fertilizer unit in fixed relation to said rear axle housing and to maintain said fertilizer unit gear member in operative association with said seed selecting unit driving gear, and a discharge tube associated with said fertilizer unit and depending therefrom on the opposite side of said axle housing relative to said seed delivery tube.

31. In an agricultural implement having a generally vertically shiftable operating unit adapted to be raised and lowered into and out of transport position, a power lift for raising and lowering said operating unit through a normal range of movement, locking means for said unit including a part biased to move into a position to hold the operating unit in raised position and means holding said part out of locked position while said operating unit occupies a position within said given range of movement, means for moving said operating unit beyond said given range and providing for the movement of said biased part into a position locking said operating unit, and means for releasing said biased part.

32. A planter comprising a supporting frame having a shaft receiving section, a seed selecting unit supported on said frame at one side of said section, a driving shaft rotatably mounted in said frame section, a gear thereon operatively connected to drive said seed selecting unit, a fertilizer attachment unit including a driving connection, and attaching extension means carried by said fertilizer attachment unit and engageable with said shaft receiving section for attaching said fertilizer attachment unit thereto and maintaining the driving connection thereof in proper position with respect to said driving gear.

33. In an agricultural implement comprising a tractor having a rear axle housing provided with attachment means carried thereby, an implement supporting bracket, means connecting the bracket to said attachment means on the tractor axle housing, a seed selecting unit attached to said bracket generally above said axle housing and overhanging the latter at one side thereof, and a fertilizer attachment unit also mounted on said bracket generally above and overhanging said axle housing at the other side thereof.

34. The combination set forth in claim 33 in which said bracket carries a driving shaft having a gear thereon and said seed selecting unit and said fertilizer attachment unit are provided with gear members meshing with said driving gear when said units are secured to said bracket.

35. The combination set forth in claim 33 in which said bracket carries a driving shaft having a gear thereon and said seed selecting unit and said fertilizer attachment unit are provided with gear members meshing with said driving gear when said units are secured to said bracket, and means for attaching said fertilizer unit to the lower portion of said bracket and to the portion thereof in which said shaft is journaled.

36. In an agricultural implement comprising a tractor having a rear axle housing provided with attachment means carried thereby, an implement supporting bracket, means connecting the bracket to said attachment means on the tractor axle housing, a seed selecting unit attached to said bracket generally above said axle housing and overhanging the latter at one side thereof, a seed selecting shaft therefor mounted at the upper end of said bracket, seed receiving furrow opener means disposed substantially directly underneath said axle housing and movably connected with said tractor forwardly of the axle housing, a lifting lever operatively connected to raise and lower said furrow opening means, and means pivoting said lifting lever on said bracket substantially directly underneath said seed selecting shaft.

37. A planter as defined in claim 36, further characterized by a clutch for interrupting the drive to said shaft, a movable transversely disposed member supported generally alongside said shaft for controlling the latter, one end of said member being disposed in a position to be engaged by a part of the lifting lever whereby actuation of the latter to raise said furrow opening means automatically disengages said clutch.

38. A planter as defined in claim 36 in which a clutch is provided for interrupting the drive to said shaft, and a lever pivoted to said bracket for controlling said clutch, one end of said lever being disposed in engagement with said lifting lever whereby actuation of the latter to raise said furrow opening means automatically disengages said clutch.

39. An agricultural implement comprising the combination of a tractor having a rear axle housing with laterally spaced attachment means on one side thereof, a bracket adapted to be disposed generally vertically and comprising laterally spaced sections, means attaching said bracket sections to the laterally spaced attachment means, and an operating unit supported at the upper end of said bracket.

40. The combination set forth in claim 39, with said bracket formed with upper and lower portions offset with respect to each other so as to dispose the upper portion of the bracket generally directly above said axle housing.

41. The combination of claim 39, further characterized by ground engaging parts movably connected with said operating unit and adapted to be raised and lowered, and means supported on said bracket for raising and lowering said parts.

42. Means for supporting an operating unit of an agricultural implement on the axle of a tractor, comprising a bracket having two spaced apart sections and means connecting said spaced sections together at their upper and lower ends.

43. An operating unit supporting bracket as defined in claim 42 wherein the lower portion of said bracket is provided with bolt-receiving apertures and the upper portion of the bracket is provided with two spaced apart operating unit receiving arms.

44. A bracket as defined in claim 42 in which the upper spaced apart portions of the bracket carry apertured lugs to receive an adjusting lever.

45. A bracket as defined in claim 42 in which the upper spaced apart portions of the bracket carry apertured lugs to receive an adjusting lever, and an abutment on the side of said bracket opposite said lugs to receive a locking part on said lever.

46. A planter including a seed selecting unit, a frame supporting said unit, a pair of bosses formed integral with said frame and extending outwardly therefrom, a driving member supported on said frame for driving said seed selecting unit, a fertilizer attachment unit including a part adapted to be driven from said driving member, means detachably connecting said fertilizer unit to said seed selecting unit comprising a pair of arms, and recesses formed in said bosses to receive said arms and position said fertilizer part in the proper position to be driven from said driving member.

47. An agricultural implement comprising the combination of a tractor having a driving axle and a housing enclosing the same, a seed selecting unit, a bracket attached to said axle housing and extending generally vertically therefrom and supporting said unit substantially directly over said axle housing, said seed selecting unit including a seeding shaft, a vertically shiftable ground engaging runner, lifting means movable generally above the axle, means including clutch mechanism and a drive chain extending generally upwardly alongside said bracket for driving the seeding shaft from the driving axle, a transverse part supported adjacent the upper end of said bracket for operating said clutch mechanism, and means for operating said part from said lifting means.

48. An agricultural implement comprising the combination of a tractor, a seed selecting unit, a bracket supporting said unit at one side of the tractor, a vertically movable furrow opener, a seeding shaft mounted for rotation adjacent said supporting bracket, clutch means at the laterally outer end of the seeding shaft for controlling the latter, a transversely extending part supported adjacent said bracket for operating said clutch means and extending from one side of said unit to the other, lifting means disposed generally between said unit and the tractor for raising said furrow opener, and means establishing engagement between the inner end of said transverse part and said lifting means for disconnecting said clutch means when the furrow opener is raised.

CHARLES H. WHITE.